US008000380B2

(12) United States Patent
Poegel

(10) Patent No.: US 8,000,380 B2
(45) Date of Patent: Aug. 16, 2011

(54) DETECTION UNIT AND METHOD FOR THE DETECTION OF DATA SYMBOLS

(75) Inventor: Frank Poegel, Dresden (DE)

(73) Assignee: Atmel Corporation, San Jose, CA (US)

( * ) Notice: Subject to any disclaimer, the term of this patent is extended or adjusted under 35 U.S.C. 154(b) by 1235 days.

(21) Appl. No.: 11/594,928

(22) Filed: Nov. 9, 2006

(65) Prior Publication Data

US 2007/0104257 A1    May 10, 2007

(30) Foreign Application Priority Data

Nov. 9, 2005  (DE) .......................... 10 2005 053 301

(51) Int. Cl.
*H04B 1/00*    (2006.01)
(52) U.S. Cl. ......... 375/150; 375/142; 375/145; 375/149
(58) Field of Classification Search .................. 375/130, 375/136–137, 140–142, 147, 149–150
See application file for complete search history.

(56) References Cited

U.S. PATENT DOCUMENTS

| | | | | |
|---|---|---|---|---|
| 2004/0076119 A1* | 4/2004 | Aronson et al. | ............... | 370/249 |
| 2005/0036573 A1* | 2/2005 | Zhang et al. | ................... | 375/343 |
| 2006/0072653 A1* | 4/2006 | Hafuka | .......................... | 375/148 |
| 2006/0285581 A1* | 12/2006 | Mattos | .......................... | 375/150 |

OTHER PUBLICATIONS

Raymond L. Pickholtz et al., "Theory of Spread-Spectrum Communications—A Tutorial," IEEE Transactions on Communications, vol. COM-30, No. 5, May 1982, pp. 855-884.
Karen E. L. Scott et al., "Resign and Performance of IEEE 802.15.4 Compliant MMSE Receivers," Conference Record of the 38$^{th}$ Asilomar Conference on Signals, Systems and Computers, Nov. 7-10, 2004, vol. 2, pp. 2051-2055.
Gianluca Mazzini et al., "Performance Evaluation of DS-CDMA Systems on Multipath Propagation Channels with Multilevel Spreading Sequences and RAKE Receivers," IEEE Transactions on Communications, vol. 46, No. 2, Feb. 1998, pp. 244-257.

\* cited by examiner

*Primary Examiner* — Kevin M Burd
*Assistant Examiner* — James M Perez
(74) *Attorney, Agent, or Firm* — Baker Botts, L.L.P.

(57) ABSTRACT

A detection unit is disclosed for the detection of data symbols contained in a demodulated signal, whereby band spreading occurs transmit-side with the use of first sequences, whose first chips each assume one of two different first values. The detection unit comprises the following units: a) a sequence providing unit, which is designed to provide a group of second sequences with at least one second chip, whereby each second sequence is assigned to a first sequence and each second chip assumes a specific value of at least two different second values, which differ amount-wise from the first values, and whereby the group has at least one second sequence that has a higher level than the first sequences, b) a correlation unit which is connected to the sequence providing unit and is designed to calculate correlation results by correlating the demodulated signal with each second sequence of the group, and c) an evaluation unit which is connected to the correlation unit and is designed to derive the values of the data symbols by evaluating the correlation results. The invention further discloses a transmitting/receiving device and to an integrated circuit with such a detection unit and to a corresponding detection method.

22 Claims, 3 Drawing Sheets

DETECTION UNIT AND METHOD FOR THE DETECTION OF DATA SYMBOLS

This nonprovisional application claims priority under 35 U.S.C. §119(a) to German Patent Application No. DE 102005053301, which was filed in Germany on Nov. 9, 2005, and which is herein incorporated by reference.

BACKGROUND OF THE INVENTION

1. Field of the Invention

The present invention relates to a detection unit and to a method for the detection of data symbols contained in a demodulated signal. The invention relates further to a transmitting/receiving device and to an integrated circuit having such a detection unit.

2. Description of the Background Art

The invention falls within the field of telecommunication. It falls particularly within the field of DSSS telecommunication systems (direct sequence spread spectrum), in which transmit-side with the use of first sequences, such as, e.g., PN sequences (pseudo noise), band spreading occurs, which is canceled receiver-side by a corresponding despreading with use of second sequences, whereby every second sequence is assigned to a first sequence and can be derived therefrom or is even identical thereto.

The number of levels of the second sequences employed receiver-side, i.e., the number of different values that the chips of the second sequences assume, corresponds in known DSSS telecommunication systems to the number of levels of the first sequences used transmit-side. If the chips of the first sequences assume, e.g., the two logic values zero and one or—equivalent hereto—the two antipodal values ±1, then typically also in the receiver two-level second sequences are used, whose chips assume precisely two different values, e.g., zero and one or ±1.

It is a disadvantage here that with expected interference effects, such as distortions, e.g., by typical transmission channels and/or degradations due to the specific receiver realization, the error probability (symbol, bit, frame error rate, etc.) in the data symbol decision is relatively high without further countermeasures and thereby the efficiency of the detection is relatively low. Countermeasures to increase efficiency, such as, e.g., advanced equalization or MLSE techniques (maximum likelihood sequence estimation) or improved receiver realizations typically involve higher implementation costs and/or increased power consumption by the transmitting/receiving device.

SUMMARY OF THE INVENTION

It is therefore an object of the present invention to provide a detection unit and a method for the detection of data symbols contained in a demodulated signal, which also achieve a low error probability under expected interference effects and, moreover, enable transmitting/receiving devices that are simple to implement and save power during operation. It is furthermore the object of the invention to provide a transmitting/receiving device and an integrated circuit.

The detection unit of the invention for the detection of data symbols contained in a demodulated signal, whereby band spreading occurs transmit-side with the use of first sequences, whose first chips each assume one of two different first values, comprises: a) a sequence providing unit, which is designed to provide a group of second sequences with at least one second chip, whereby each second sequence is assigned to a first sequence and each second chip assumes one specific value of at least two different second values, which differ amount-wise from the first values, and whereby the group has at least one second sequence that has a higher level than the first sequences, b) a correlation unit that is connected to the sequence providing unit and is designed to calculate correlation results by correlating the demodulated signal with each second sequence of the group, and c) an evaluation unit that is connected to the correlation unit and is designed to derive the values of the data symbols by evaluating the correlation results.

The transmitting/receiving device of the invention and the integrated circuit of the invention can each have this type of detection unit.

The method of the invention for the detection of data symbols contained in a demodulated signal, whereby band spreading occurs transmit-side with the use of first sequences, whose first chips each assume one of two different first values, comprises the following steps: a) provision of a group of second sequences with at least one second chip, whereby each second sequence is assigned to a first sequence and each second chip assumes one specific value of at least two different second values, which differ amount-wise from the first values, and whereby the group has at least one second sequence that has a higher level than the first sequences, b) calculation of the correlation results by correlating the demodulated signal with each second sequence of the group, and c) deriving the values of the data symbols by evaluating the correlation results.

In an embodiment, an object of the invention is to despread the demodulated signal with use of a group of second sequences, which has at least one second sequence that is a higher level than the first sequences used transmit-side and therefore in comparison with the first sequences can assume a higher number of different values. In the two-level first sequences, whose chips ("first chips"), for example, each assume one of the two values ±1 or 0.1 ("first values"), at least one second sequence of the group has at least one chip ("second chip") that assumes one of at least two "second" values (e.g., ±2 or ±2, ±4) that differ amount-wise from the first values.

This makes it possible to correctly detect (decide) the demodulated signal also under expected interference effects, such as distortions, e.g., by typical transmission channels and/or degradations due to the specific receiver realization, so that the error probability (symbol, bit, frame error rate, etc.) of the detection decreases, when the data symbols are transmitted, e.g., over typical distorting transmission channels such as frequency-selective multipath channels or time-variant and frequency-selective mobile radio channels and/or the received signal experiences additional distortions, e.g., by a receiving filter, is quantified with a bit width of only a few bits, etc.

The invention is furthermore very simple to realize, so that implementations of the detection unit and thereby the transmitting/receiving device, which are simple in design and power-saving to operate, become possible. This is advantageous particularly when—as in applications in industrial monitoring and control, sensor networks, and automation, or in the field of computer peripherals—an extremely low power requirement and a very simple realization are indispensable. Although the invention is not limited to the IEEE standard 802.15.4, this is the case by way of example in transmitting/receiving devices for this communication standard.

In an embodiment of the detection unit of the invention or the method of the invention, the value of the at least one second chip or/and its chip position within its second sequence are selected in such a way that the error probability of detection due to the correlation decreases with this second sequence, when the data symbols are transmitted over at least one typical transmission channel. The efficiency of the detection improves as a result of selecting the values of the second chips of a second sequence and/or the chip positions of the second chips within this second sequence in such a way that the error probability of the detection in a transmission of the data symbols over at least one typical (specified) transmission channel decreases.

In another embodiment, the number of second chips, present in a second sequence, is selected in such a way that a number of second chips, exceeding this number, does not cause a major decrease in the error probability of detection, when the data symbols are transmitted over at least one typical transmission channel. This enables especially simple implementations.

In another embodiment, each second chip assumes one specific value of at least two different second values, which each correspond amount-wise to an integer positive power of two. This enables especially simple implementations at a low error probability, because the receiver-side correlation unit need not perform real multiplications.

Each second chip can assume one specific value of four different second values, which correspond amount-wise to the 2× or 4× value of one of the first values. This enables especially simple implementations.

Each second chip can assume one specific value of two different second values, which correspond amount-wise to the 2× value of one of the first values. This enables especially simple implementations.

In another embodiment, the sign of each second chip of a second sequence agrees with the sign of the positionally equivalent chip of the two-level sequence, usable receiver-side, that is assigned to the first sequence to which this second sequence is assigned. Because the signs of the second chips each agree with the sign of the particularly positionally equivalent (i.e., index-equivalent) chip of the two-level sequence, actually usable receiver-side, the error probability and the implementation cost are reduced.

In another embodiment, each second sequence can have at least one third chip, which in each case assumes one of two different third values, which agree amount-wise with one of the first values. This enables especially simple implementations. In addition, this also avoids the case, disadvantageous for the efficiency, that all chip values of a second sequence differ only in a fixed factor (i.e., the same from chip index to chip index) from the index-wise corresponding chip values of a two-level sequence actually to be used receiver-side.

In every second sequence the total number of the second and third chips can agree with the number of the chips present overall in this second sequence. Thereby, no chips, which have neither one of the first nor one of the second values, are present in the second sequences, which simplifies implementation.

In an embodiment of the detection unit of the invention, the group provided by the sequence providing unit comprises a total of $n \geq 1$ second sequences, whereas the correlation unit has n multiplication units and n downstream integration units, whereby the multiplication units, each connected to the sequence providing unit, calculate n product signals by multiplying (individually delayed or not delayed) signal values of the demodulated signal by chip values in each case of one of the second sequences, and then each integration unit provides a correlation result by adding a number of signal values of the corresponding product signal. This type of realization of the correlation unit is very simple, requires very little operating energy, and enables a high efficiency in the detection error rate.

The multiplication units can have a device for sign reversal and a device for bit shifting. The hardware expenditure and power consumption of the detection unit are reduced further thereby.

In another embodiment, the sequence providing unit has precisely one memory, which is designed to store precisely one (i.e., and only one) of the second sequences. A memory, whose size is dimensioned in this way, can be advantageously very simply implemented and operated by saving power.

The memory can be made as a feedback shift register. The very simple structure of a shift register of series-connected register cells makes possible a very efficient and simple realization of the sequence providing unit with a very low power requirement. Thus, e.g., neither calculation of memory addresses nor a complex control logic is required for the shift register.

The sequence providing unit provides the second sequences at the outputs of the specific (several) register cells of the shift register. For this purpose, means are provided for clocking the feedback shift register. All second sequences of the group with or without a time offset among each other can be provided very simply in this way.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
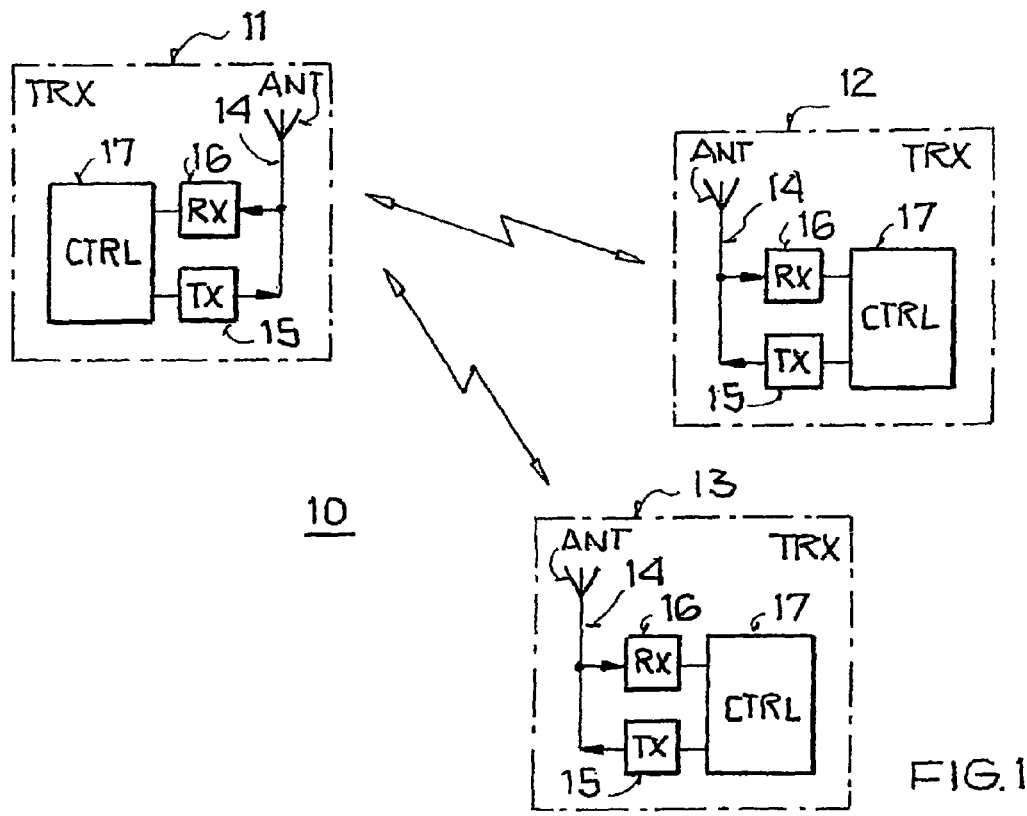
FIG. 1 illustrates a "Wireless Personal Area Network" (WPAN) according to the IEEE Standard 802.15.4 with transmitting/receiving devices of the invention.

In the figures, the same and functionally identical elements and signals, if not specified otherwise, are provided with the same reference characters.

Although usable in principle in any DSSS communication systems, the present invention will be described below using the example of a "ZigBee" communication system according to communication standard IEEE 802.15.4.

For wireless transmission of information over relatively short distances, so-called "Wireless Personal Area Networks" WPANs can be used, which require little or even no infrastructure, so that small, simple, power-efficient, and cost-effective devices can be implemented for a broad range of applications.

Standard IEEE 802.15.4 specifies low-rate WPANs, which are suitable with raw data rates up to a maximum of 250 kbit/s and stationary or mobile devices for applications in industrial monitoring and control, in sensor networks, in automation, and in the field of computer peripherals and for interactive games. In addition to a very simple and cost-effective implementability of the devices, an extremely low power requirement is of critical importance for such applications. Thus, an objective of this standard is a battery life of several months to several years.

At the level of the physical layer, in the virtually globally available 2.4 GHz ISM frequency band (industrial, scientific, medical) for raw data rates of fB=250 kbit/s, IEEE 802.15.4 specifies band spreading (spreading) with a chip rate of fC=2 Mchip/s and offset QPSK modulation (quaternary phase shift keying).

FIG. 1 shows an example of WPAN 10 according to IEEE 802.15.4. It comprises three transmitting/receiving devices (transceiver, TRX) 11-13 in the form of stationary or mobile devices, which exchange information in a wireless manner by means of radio signals. Transmitting/receiving device 11 is a so-called full-function device, which takes on the function of the WPAN coordinator, whereas transmitting/receiving devices 12, 13 are so-called reduced-function devices, which are assigned to the full-function device 11 and can only exchange data with said device. Apart from the star network topology depicted in FIG. 1, in which bidirectional data transmission can only occur between one of the reduced-function devices 12, 13 and the full-function device 11, but not between the reduced function devices 12, 13, the standard also provides so-called "peer-to-peer" topologies, in which all full-function devices can communicate with all other full-function devices.

Transmitting/receiving devices 11-13 each comprise an antenna 14, a transmitting unit (transmitter, TX) 15 connected to the antenna, a receiving unit (receiver, RX) 16 connected to the antenna, and a control unit (control unit, CTRL) 17, connected to the transmitting and receiving unit, for controlling transmitting and receiving units 15, 16. Furthermore, transmitting/receiving units 11-13 each contain a power supply unit, not shown in FIG. 1, in the form of a battery, etc., to supply power to units 15-17, and possibly other components such as sensors, actuators, interfaces, etc.

It will be assumed in the following text that the data transmission occurs in the 2.4 GHz ISM frequency band.

Transmitting unit 15 of each transmitting/receiving device converts the data stream to be transmitted according to IEEE 802.15.4 into a radio signal to be emitted via its antenna 14. For this purpose, the data stream to be transmitted (raw data rate fB=250 kbit/s) is first converted into a sequence of PN sequences (pseudo-noise) with the use of four databits in each symbol period (TS=16 μs), in order to select a PN sequence for a sequence set of a total of 16 quasi-orthogonal PN sequences P0, P1, . . . , P15. Each symbol d0, d1, d2, . . . of four databits is assigned in this manner a symbol value-specific PN sequence of 32 chips (chip rate fC=2 Mchip/s). This conversion into PN sequences corresponds to band spreading (spreading). The successive PN sequences are then offset-QPSK-modulated (quaternary phase shift keying)—with half-sine pulse formation—, spectrally shifted into the ISM frequency band, and finally amplified for the transmission.

Accordingly, receiving unit 16 of each transmitting/receiving device converts a radio signal received from its antenna 14 (and generated by the transmitting unit of another transmitting/receiving device according to the IEEE Standard 802.15.4) without errors if possible into the transmitted data by demodulating the radio signal inter alia and detecting (deciding) the data.

Transmitting unit 15 and receiving unit 16 of a transmitting/receiving device are hereby part of an integrated circuit (IC) (not shown in FIG. 1), e.g., an ASIC (application specific integrated circuit), whereas control unit 17 can be a microcontroller (also not shown). The transmitting/receiving device can also have only one IC (e.g., made as an ASIC), which senses the functions of transmitting unit 15, receiving unit 16, and control unit 17.

Figure 2:
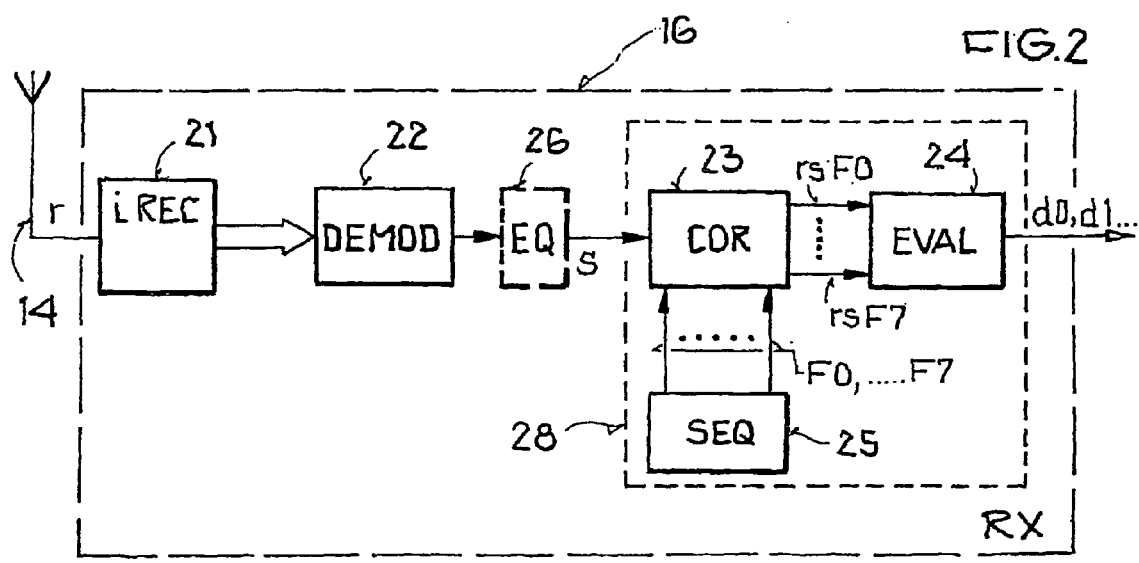
FIG. 2 illustrates a receiving unit with a detection unit, according to an embodiment of the present invention.

FIG. 2 shows a block diagram of an incoherent receiving unit (RX) 16, which comprises the following functional blocks connected in series: an internal receiver (iREC) 21, a differential demodulator (DEMOD) 22, and a detection unit 28, which has a correlation unit (COR) 23 and a downstream evaluation unit (EVAL) 24, as well as a sequence providing unit (SEQ) 25 connected to correlation unit 23. In addition, receiving unit 16 optionally has an equalizer (EQ) 26 between demodulator 22 and detection unit 28.

Internal receiver 21 connected to antenna 14 of the transmitting/receiving device converts the received radio signal r into a complex baseband signal b (envelope), which has complex-valued sampling values in the clock of the transmit-side chips of the PN sequences (fC). Each complex sampling value hereby comprises a real part (in-phase component I) and an imaginary part (quadrature component Q). Complex-valued signals like the baseband signal b are shown in the figures by arrows with double lines.

The baseband signal b is then converted by differential demodulator 22 into a demodulated signal, which has real-valued signal values in the chip clock fC. Advantageously, differential demodulator 22 generates a demodulated signal, whose signal value has so-called soft information values (higher level signal values) instead of the so-called hard bits (i.e., two-level values).

The demodulated signal is then optionally partially equalized. The simple equalizer 26 provided for this purpose determines a mean of the demodulated signal and releases this signal subsequently by subtracting the mean from a direct component. The differentially demodulated (and optionally equalized) signal is designated with an s below.

Next, the data symbols d0, d1, d2, . . . , contained in the differentially demodulated (and optionally equalized) signal s, are detected, i.e., decided, by detection unit 28. For this purpose, the signal s present in the chip clock fC is first correlated in correlation unit (COR) 23 with a group of sequences F0, F1, . . . , F7, which are provided by sequence providing unit 25, and thereby equalized. This leads to the correlation results rsF0, rsF1, . . . , rsF7, which represent a measure for the conformity of the signal s with the particular sequence F0, F1, . . . , F7. The correlation results rsF0, rsF1, . . . , rsF7 are finally evaluated in evaluation unit (EVAL) 24 and the data symbols d0, d1, d2, . . . are detected (decided). The lower the probability of wrong decisions in the detection, i.e., the lower the symbol, bit, or frame error rate, the higher the efficiency of detection unit 28.

An embodiment of the detection unit 28 of the invention is described below with reference to FIG. 3. First, however, it will be described how, according to FIG. 2, sequences F0, F1, . . . , F7 provided by sequence providing unit 25 are obtained and determined.

Below, the PN sequences P0, P1, . . . , P15, usable transmit-side, are called the "first" sequences and the sequences F0, F1, . . . , F7, to be provided receiver-side according to the invention, "second" sequences.

In the following table, the chip values of the first and second sequences are provided, inter alia.

The first sequences P0, P1, ..., P15 are 16 quasi-orthogonal sequences according to IEEE 802.15.4. Each first sequence P0, P1, ..., P15 comprises 32 chips, each of which P0, P1, ... are also called "first" chips below.

Pi: first sequence i (transmit-side) (Pic0 Pic1 Pic2 Pic3 ... Pic30 Pic31)

Fi: contribution of the second sequence (receiver-side) (Fic0 Fic1 Fic2 Fic3 ... Fic30 Fic31)

| | | | | | | | | | | | | | | | | |
|---|---|---|---|---|---|---|---|---|---|---|---|---|---|---|---|---|
| P0: | 11 | 01 | 10 | 01 | 11 | 00 | 00 | 11 | 01 | 01 | 00 | 10 | 00 | 10 | 11 | 10 |
| G0: | ++ | +- | -- | +- | -+ | ++ | -+ | ++ | +- | +- | ++ | +- | -+ | +- | ++ | -- |
| F0: | 12 | 11 | 21 | 22 | 11 | 21 | 11 | 11 | 11 | 11 | 11 | 12 | 11 | 11 | 11 | 11 |
| P1: | 11 | 10 | 11 | 01 | 10 | 01 | 11 | 00 | 00 | 11 | 01 | 01 | 00 | 10 | 00 | 10 |
| G1: | ++ | -- | ++ | +- | -- | -- | -+ | ++ | -+ | ++ | +- | +- | ++ | +- | -+ | +- |
| F1: | 11 | 11 | 12 | 11 | 21 | 22 | 11 | 21 | 11 | 11 | 11 | 11 | 11 | 12 | 11 | 11 |
| P2: | 00 | 10 | 11 | 10 | 11 | 01 | 10 | 01 | 11 | 00 | 00 | 11 | 01 | 01 | 00 | 10 |
| G2: | -+ | +- | ++ | -- | ++ | +- | -- | -- | -+ | ++ | -+ | ++ | +- | +- | ++ | +- |
| F2: | 11 | 11 | 11 | 11 | 12 | 11 | 21 | 22 | 11 | 21 | 11 | 11 | 11 | 11 | 11 | 12 |
| P3: | 00 | 10 | 00 | 10 | 11 | 10 | 11 | 01 | 10 | 01 | 11 | 00 | 00 | 11 | 01 | 01 |
| G3: | ++ | +- | -+ | +- | ++ | -- | ++ | +- | -- | -- | -+ | ++ | -+ | ++ | +- | +- |
| F3: | 11 | 12 | 11 | 11 | 11 | 11 | 12 | 11 | 21 | 22 | 11 | 21 | 11 | 11 | 11 | 11 |
| P4: | 01 | 01 | 00 | 10 | 00 | 10 | 11 | 10 | 11 | 01 | 10 | 01 | 11 | 00 | 00 | 11 |
| G4: | +- | +- | ++ | +- | -+ | +- | ++ | -- | ++ | +- | -- | -- | -+ | ++ | -+ | ++ |
| F4: | 11 | 11 | 11 | 12 | 11 | 11 | 11 | 11 | 12 | 11 | 21 | 22 | 11 | 21 | 11 | 11 |
| P5: | 00 | 11 | 01 | 01 | 00 | 10 | 00 | 10 | 11 | 10 | 11 | 01 | 10 | 01 | 11 | 00 |
| G5: | -+ | ++ | +- | +- | ++ | +- | -+ | +- | ++ | -- | ++ | +- | -- | -- | -+ | ++ |
| F5: | 11 | 11 | 11 | 11 | 11 | 12 | 11 | 11 | 11 | 11 | 12 | 11 | 21 | 22 | 11 | 21 |
| P6: | 11 | 00 | 00 | 11 | 01 | 01 | 00 | 10 | 00 | 10 | 11 | 10 | 11 | 01 | 10 | 01 |
| G6: | -+ | ++ | -+ | ++ | +- | +- | ++ | +- | -+ | +- | ++ | -- | ++ | +- | -- | -- |
| F6: | 11 | 21 | 11 | 11 | 11 | 11 | 11 | 12 | 11 | 11 | 11 | 11 | 12 | 11 | 21 | 22 |
| P7: | 10 | 01 | 11 | 00 | 00 | 11 | 01 | 01 | 00 | 10 | 00 | 10 | 11 | 10 | 11 | 01 |
| G7: | -- | -- | -+ | ++ | -+ | ++ | +- | +- | ++ | -+ | +- | ++ | -- | ++ | +- |
| F7: | 21 | 22 | 11 | 21 | 11 | 11 | 11 | 11 | 11 | 12 | 11 | 11 | 11 | 11 | 12 | 11 |
| P8: | 10 | 00 | 11 | 00 | 10 | 01 | 01 | 10 | 00 | 00 | 01 | 11 | 01 | 11 | 10 | 11 |
| G8: | -- | -+ | ++ | ++ | +- | -- | +- | -- | -+ | -+ | -- | -+ | +- | -+ | -- | ++ |
| F8: | 12 | 11 | 21 | 22 | 11 | 21 | 11 | 11 | 11 | 11 | 11 | 12 | 11 | 11 | 11 | 11 |
| P9: | 10 | 11 | 10 | 00 | 11 | 00 | 10 | 01 | 01 | 10 | 00 | 00 | 01 | 11 | 01 | 11 |
| G9: | -- | ++ | -- | -+ | ++ | ++ | +- | -- | +- | -- | -+ | -+ | -- | -+ | +- | -+ |
| F9: | 11 | 11 | 12 | 11 | 21 | 22 | 11 | 21 | 11 | 11 | 11 | 11 | 11 | 12 | 11 | 11 |
| P10: | 01 | 11 | 10 | 11 | 10 | 00 | 11 | 00 | 10 | 01 | 01 | 10 | 00 | 00 | 01 | 11 |
| G10: | +- | -+ | -- | +- | ++ | -- | -+ | ++ | +- | -- | +- | -- | -+ | -+ | -- | -+ |
| F10: | 11 | 11 | 11 | 11 | 12 | 11 | 21 | 22 | 11 | 21 | 11 | 11 | 11 | 11 | 11 | 12 |
| P11: | 01 | 11 | 01 | 11 | 10 | 11 | 10 | 00 | 11 | 00 | 10 | 01 | 01 | 10 | 00 | 00 |
| G11: | -- | -+ | +- | -+ | -- | ++ | -- | -+ | ++ | ++ | +- | -- | +- | -- | -+ | -+ |
| F11: | 11 | 12 | 11 | 11 | 11 | 11 | 12 | 11 | 21 | 22 | 11 | 21 | 11 | 11 | 11 | 11 |
| P12: | 00 | 00 | 01 | 11 | 01 | 11 | 10 | 11 | 10 | 00 | 11 | 00 | 10 | 01 | 01 | 10 |
| G12: | -+ | -+ | -- | -+ | +- | -+ | -- | ++ | -- | -+ | ++ | ++ | +- | -- | +- | -- |
| F12: | 11 | 11 | 11 | 12 | 11 | 11 | 11 | 12 | 11 | 21 | 22 | 11 | 21 | 11 | 11 |
| P13: | 01 | 10 | 00 | 00 | 01 | 11 | 01 | 11 | 10 | 11 | 10 | 00 | 11 | 00 | 10 | 01 |
| G13: | +- | -- | -+ | -+ | -- | -+ | +- | -+ | -- | ++ | -- | -+ | ++ | ++ | +- | -- |
| F13: | 11 | 11 | 11 | 11 | 11 | 12 | 11 | 11 | 11 | 12 | 11 | 21 | 22 | 11 | 21 |
| P14: | 10 | 01 | 01 | 10 | 00 | 00 | 01 | 11 | 01 | 11 | 10 | 11 | 10 | 00 | 11 | 00 |
| G14: | +- | -- | +- | -- | -+ | -+ | -- | -+ | +- | -+ | -- | ++ | -- | -+ | ++ | ++ |
| F14: | 11 | 21 | 11 | 11 | 11 | 11 | 11 | 12 | 11 | 11 | 11 | 11 | 12 | 11 | 21 | 22 |
| P15: | 11 | 00 | 10 | 01 | 01 | 10 | 00 | 00 | 01 | 11 | 01 | 11 | 10 | 11 | 10 | 00 |
| G15: | ++ | ++ | +- | -- | +- | -- | -+ | -+ | -- | -+ | +- | -+ | -- | ++ | -- | -+ |
| F15: | 21 | 22 | 11 | 21 | 11 | 11 | 11 | 11 | 11 | 12 | 11 | 11 | 11 | 11 | 12 | 11 | assume a value of logic zero (0) or one (1), so that the first sequences are two-level sequences. As is evident from the table, e.g., the first eight chips of the first PN sequence P0 assume the values {1 1 0 1 1 0 0 1}. Instead of logic values (0, 1), the equivalent values hereto, such as, e.g., the antipodal values +1 or −1, can be used. Regardless of this, the two different values, which the chips of the first sequences assume, are designated below as "first" values.

For the chips, e.g., of the first sequence P0, to simplify the description, the following parameters are introduced: P0c0 (chip with index zero (c0) of P0, shown on the far left in the table), P0c1 (chip with index 1 (c1) of P0), ..., P0c31 (chip with index 31 (c31), shown on the far right in the table). Similar to this, e.g., P5c2 designates the chip with the index 2 of the sequence P5, therefore the third chip from the left in the P5 line in the table. In addition, the chips of the first sequences A sequence G0, G1, ..., or G15, assigned to the specific first sequence and usable receiver-side for despreading/correlation, is entered below each first sequence P0, P1, ... in the table. These likewise two-level sequences are adapted to the receiving concept, described above in regard to FIG. 2, with a differential demodulation. The chip values of these sequences result from a logic XORing of the logic values of the two neighboring first chips of the assigned first sequence with subsequent conversion of the logic result value to the antipodal values +1 and −1, whereby for reasons of clarity, only the sign of these values is entered in the table. Analogous to the parameters introduced above, e.g., G4c8 designates the chip with index 8 of the sequence G4.

Below each of these two-level sequences G0, G1, ..., another of the four-level sequences F0, F1, ..., assigned to the specific first sequence and usable receiver-side for despreading/correlation, is entered in the table, whose chips each assume the values ±1 and ±2, whereby in the table in the line for the particular sequence F0, F1, . . . only the absolute values of the chip values are entered (e.g., |F0c4|=2 for the fifth chip from the left in the F0 line) and the signs result from the above line for the corresponding sequence G0, G1, . . . (in the above example G0c4=−1, so that F0c4=−2). The above eight sequences F0, F1, . . . , F7 are the groups of second sequences to be provided according to the invention.

The second sequence F0 therefore has the following chip values:

$$F0=\{+1+2+1-1-2-1-2-2-1+1+2+1-1+1+1+1 \ldots + 1-1+1-1 +1+1+1-2-1+1+1-1+1+1-1-1\} \quad (1)$$

It is evident from the table that the top eight sequences F0, F1, . . . , F7 differ from one another only in a cyclic shift of their chip values. Thus, e.g., the bit pattern {+1 +2 +1 −1 −2 −1}, occurring at the start of the sequence F0, is evident—in a cyclic expansion—in the sequence F1 starting at the chip F1c4, in the sequence F2 starting at F2c8, in F3 starting at F3c12, in F4 starting at F4c16, . . . , and finally in F7 starting at F7c28. The bottom eight sequences F8, F9, . . . , F15 also differ from one another only in a cyclic shift.

It is to be noted, furthermore, that for each sequence from the group F0, F1, . . . , F7 there is a sequence from the group F8, F9, . . . , F15, which differs only in a sign reversal of all of its chip values. If, e.g., the sequences F0 and F8 are compared, it becomes evident that all index-equivalent chip values differ only in their sign. Because this also applies to the sequence pairs F1/F9, F2/F10, etc., it is to be noted that all sequences of the group F0, F1, . . . , F7 are contained in "inverted" form in the group F8, F9, . . . , F15.

The properties, indicated in the previous paragraphs, of the sequences F0, F1, . . . enable extremely simple realizations of correlation unit 23, evaluation unit 24, and sequence providing unit 25, and thereby detection unit 28 of FIG. 2. This type of realization will be described below with reference to FIG. 3.

The chips of the second sequences F0, F1, . . . , F7 that assume a value which differs amount-wise from the values of the first chips (i.e., from the "first" values) are called "second" chips hereafter. The values that the second chips assume are called "second values."

The chips of the second sequences F0, F1, . . . , F7 that assume a value which agrees amount-wise with one of the first values are called "third" chips hereafter. The values that the third chips assume are called "third" values.

According to the table or Equation (1), the sequence F0 thereby has a total of M0=6 second chips F0c1, F0c4, F0c6, F0c7, F0c10, and F0c23, each of which assume one of the second values ±2. In addition, F0 has a total of 32−M0=26 third chips F0c0, F0c2, F0c3, F0c5, F0c8, F0c9, F0c11, . . . , F0c22, F0c24, . . . , F0c31, each of which assumes one of the third values ±1. Because of the aforementioned properties, the sequences F1, F2, . . . , F7 also contain M1=6, M2=6, . . . , or M7=6 second and 26 third chips.

It will be described by way of example below how the second sequences F0, F1, . . . , F7 are determined. It is to be noted first that in the above-described case, the two-level sequences G0, . . . , G15, to be used actually receiver-side, differ from one another only in a cyclic shift and/or a sign change. Such properties considerably simplify the implementation of the receiving units and therefore also apply to the sequences F0, F1, . . . to be used receiver-side according to the invention. In this respect, it is sufficient in this case to determine a single second sequence (e.g., F0) and to derive the other second sequences from F0 by a cyclic shift and/or sign change of all chip values. As described above, the signs of the chips of the second sequence F0 correspond to those of the index-equivalent chips of the two-level sequence G0. Therefore, the positions (indexes) of the second chips within the sequence F0 are still to be determined.

The positions can be determined in advance, e.g., by Monte Carlo simulations, by transmitting a transmitted signal in which spreading with the sequence P0 occurs, over a transmission channel typical for the corresponding application (in the case of IEEE 802.15.4, e.g., over a typical frequency-selective indoor channel) and then detecting it receiver-side, whereby for the despreading/correlation a first test sequence is used, which results from the sequence G0 according to the above table, by doubling (only) the value of the chip G0c0 to two. For detection with use of this first test sequence, an error probability is determined (bit, symbol, frame error rate, etc.). Next, the incoming signal with an unchanged received power is detected with use of a second test sequence in which instead of the chip G0c0 the index-wise following chip G0c1 is doubled in its value (G0c1=2) and an error probability is again determined. This method is continued up to 32 test sequences, in which (only) the chip G0c31 is doubled in its value (G0c31=−2). Finally, the position, i.e., the index of the chip is determined that has resulted in the lowest error probability during its doubling in value. Thereby, the position of the first "second" chip of F0 is determined.

To determine the positions of an additional "second" chip, additional Monte-Carlo simulations with additional test sequences are performed, which retain the value-wise doubling of the first "second" chip and in each case double another, not yet doubled chip value. Here as well, the position that leads to the lowest error probability is determined as the position (index) of the additional "second" chip. This method is continued until either a predefined number M0 of second chips of the sequence F0 is determined in regard to its position or until no further substantial reduction in error probability is possible. The second sequence F0, to be provided according to the invention, is obtained as the best test sequence found using this method.

This method can be carried out, e.g., for a "worst case" transmission channel, typical for the particular application, or for several typical transmission channels, whereby then, e.g., the error probability achieved on average for all typical transmission channels is taken into account.

In another embodiment of the invention, the second chips assume not only two different second values (±2), but at least two additional second values. In this case as well, within the scope of a simulation process, the second value that produces the lowest error probability on average if applicable is selected for a second chip. Advantageous hereby are second values that correspond amount-wise to an integer positive power of two (e.g., 2, 4, 8, 16, . . . ), because multiplications with such second values (±2, ±4, ±8, ±16, . . . ) can occur very simply with the use of bit shifters.

Figure 3:
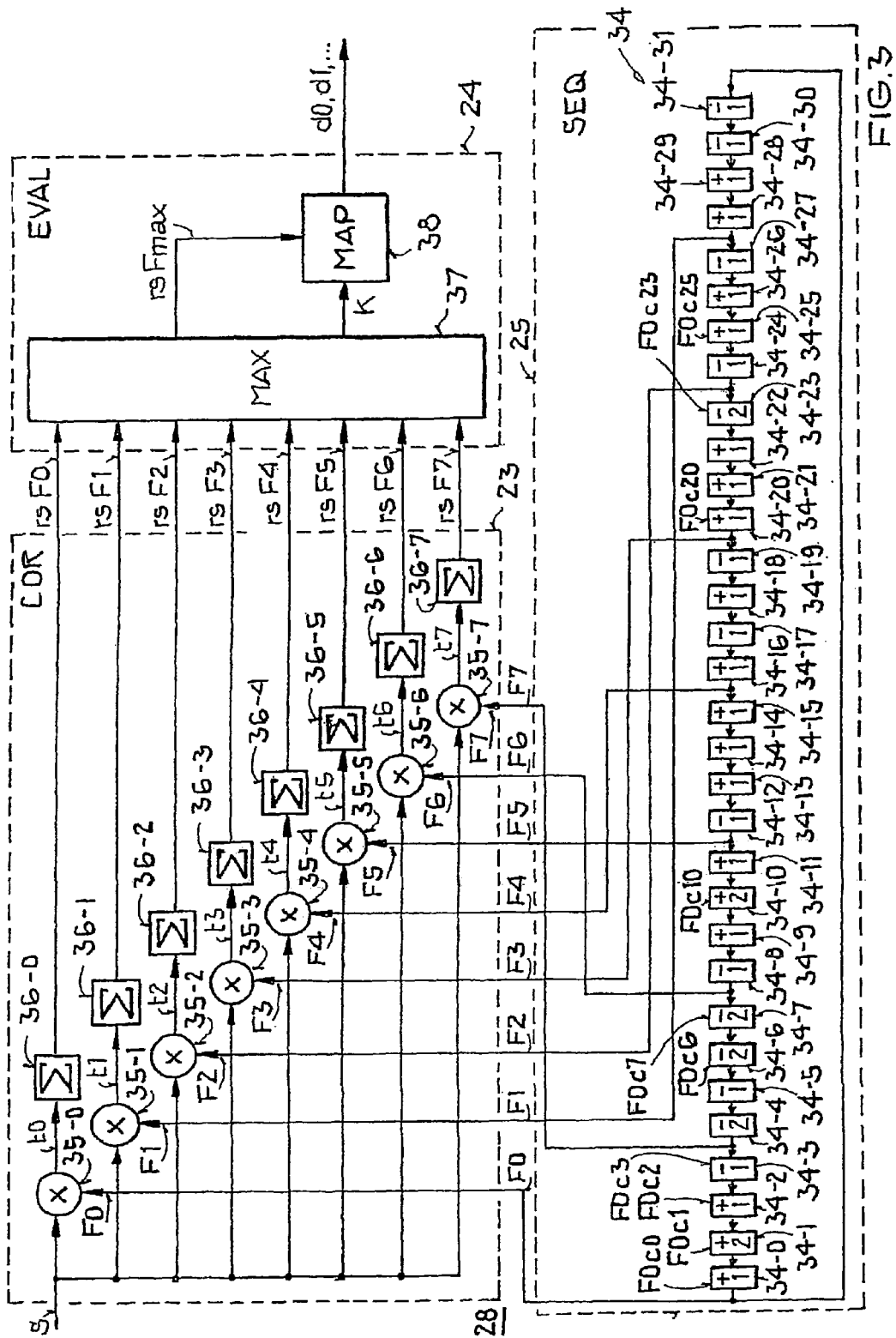
FIG. 3 illustrates an embodiment of a detection unit of the invention.

FIG. 3 shows a block diagram of an embodiment of the detection unit 28 of FIG. 2.

Sequence providing unit 25 has a memory 34, which is connected to correlation unit 23 and whose size is dimensioned in such a way that precisely one of the second sequences can be stored. In the case of the second sequences F0, F1, . . . explained with reference to the above table, memory 34 therefore is suitable for storing 32 chip values. In four-level second chips, this means a memory space requirement of only 64 bits.

Preferably, the memory 34 is made as a feedback shift register 34 with a total of 32 register cells 34-0, 34-1, . . . , 34-31 for storing one chip value each of a second sequence. In FIG. 3, by way of example, a state of the shift register 34 is drawn, in which register cells 34-0, 34-1, . . . , 34-31 from left to right have the chip value of the second sequence F0 according to Equation (1). If the register cells of the shift register are now clocked in the chip clock fC (not shown in FIG. 3), then the stored content of the register cells per chip period 1/fC shifts left by one register cell, so that the second sequence F0 is provided at the output of the first register cell 34-0 in the next 32 chip periods. Because of the feedback in the shift register, the shift of the content occurs cyclically, which is why the second sequence F0 then repeats in continuous clocking.

As explained above with reference to the table, the additional second sequences F1, F2, . . . , F7 differ from the second sequence F0 only in a cyclic shift. The second sequences F1, F2, . . . , F7 can therefore either be tapped also at the output of the first register cell 34-0 (then however beginning later in time than F0) or at the outputs of other register cells (with or without a time offset in regard to F0).

FIG. 3 shows the register cells at which the other second sequences F1, F2, . . . , F7 are tapped, when they are to be provided simultaneously, i.e., within the same time interval as the second sequence F0. According to the previously explained table, e.g., the second sequence F7 begins with the value pattern {−2 −1 −2 −2 −1}. This value pattern is evident in the second sequence F0 beginning with the fifth chip from the left, i.e., beginning with chip F0c4. For this reason, the feedback shift register 34 of FIG. 3 provides the second sequences F0 and F7 precisely simultaneously, when F7 is tapped at the output of the fifth register cell 34-4 and F0—as already described—at the output of the first register cell 34-0. Analogous observations show that the additional second sequences F1, F2, . . . , F6 are provided simultaneously at the outputs of register cells 34-28, 34-24, 34-20, 34-16, 34-12, or 34-8, as shown in FIG. 3. For the simultaneous provision of the group of eight sequences F0, F1, . . . , F7, therefore according to FIG. 3, eight outputs of sequence providing unit 25 are provided, which are connected to the outputs of register cells 34-0, 34-28, 34-24, 34-20, 34-16, 34-12, 34-8, or 34-4.

It is possible in this way by means of a feedback shift register 34 having only 32 register cells, which is initialized, e.g., with the chip values of the (previously determined, e.g., by means of the above-described simulation process) second sequence F0 according to Equation (1), to realize a very simple and power-saving sequence providing unit 25, which is suitable for providing all eight second sequences F0, F1, . . . , F7. The eight sequences F8, F9, . . . , F15 are not provided. This simplifies substantially the realization of correlation unit 23 and evaluation unit 24, as is described in greater detail hereafter.

Correlation unit 23 has eight multiplication units 35-0, 35-1, . . . , 35-7, each with two inputs, and also eight integration units 36-0, 36-1, . . . , 36-7, each connected downstream to a multiplication unit.

The first inputs of multiplication units 35-0, 35-1, . . . , 35-7 are supplied with the same signal, namely, the (optionally equalized) demodulated signal s (cf. FIG. 2). The second inputs of multiplication units 35-0, 35-1, . . . , 35-7 are connected to the outputs of register cells 34-0, 34-28, 34-24, 34-20, 34-16, 34-12, 34-8, or 34-4 of feedback shift register 34, so that they are supplied with second sequences F0, F1, or F7.

The operating mode of the i-th branch of the correlation unit will be explained below, whereby i=0, 1, . . . , 7. Multiplication unit 35-$i$ multiplies the values of the (optionally equalized) demodulated signal s with the chip values of the second sequence Fi and thus calculates a product signal ti. Thus, 32 signal values of the product signal ti are generated per symbol period TS. The downstream integration unit 36-$i$ adds a predefined number of these 32 signal values of the corresponding product signal ti and thus provides a correlation result rsFi per symbol period.

According to the above table, the chips of the second sequences can assume the four values ±1 and ±2. The multiplication of the (optionally equalized) demodulated signal s by the chip values of the second sequences in this case therefore causes a sign reversal and/or a doubling of the values of the demodulated signal s. For this reason, multiplication units 35-0, 35-1, . . . , 35-7 each advantageously have a sign inverter and a bit shifter.

Evaluation unit 24 has a maximum value determination unit (MAX) 37, connected to integration units 36-0, 36-1, . . . , 36-7, and a downstream allocation unit (MAP) 38.

Maximum value determination unit 37 compares per symbol period eight correlation results rsF0, rsF1, . . . , rsF7 amount-wise with each other and determines the (signed) value of the maximum absolute value correlation result rsFmax and a sequence index k with integer values between 0 and 7, which indicates which of the second sequences F0, F1, . . . , F7 is to be assigned this signed value. If, therefore, e.g., the correlation result rsF5 has the maximum absolute value of all eight correlation results, maximum value determination unit 37 thus determines the signed value rsFmax=rsF5 and the sequence index k=5, which points to the second sequence F5.

Allocation unit 38 takes into account the fact that in the correlation unit the correlation was performed only with the eight second sequences F0, F1, . . . , F7, but not with the eight sequences F8, F9, . . . , F15. Because of the above-described property of the sequences, according to which for each second sequence F0, F1, . . . , F7 there is one of the sequences F8, F9, . . . , F15, which differs only in a sign reversal of all its chip values, the correlation result, e.g., for F13, would differ only in the sign from that for F5. For this reason, allocation unit 38 evaluates the sign of rsFmax.

Allocation unit 38 determines from the sequence index k and the sign of rsFmax the value of one of the transmitted data symbols d0, d1, . . . . If the signed value rsFmax is positive, the data symbol value is determined that is assigned the sequence from the first eight sequences P0, P1, . . . , P7 that is assigned the second sequence with the sequence index k, i.e., Fk. If the data symbol value d=5, e.g., is assigned the first sequence P5 and this in turn, as described above with reference to the table, the second sequence F5, allocation unit 38 in the above example thus determines the data symbol value as d=k=5, when rsFmax=rsF5>0.

If the signed value rsFmax is negative, however, allocation unit 38 thus determines the data symbol value that is assigned the sequence of the second eight sequences P8, P9, . . . , P15 that is assigned to the sequence inverse to the second sequence with the sequence index k (Fk). If the data symbol value d=13, e.g., is allocated the first sequence P13 and this in turn, as described above with reference to the table, the sequence F13=−F5, allocation unit 38 in the above example thus determines the data symbol value as d=k+8=13, when rsFmax=rsF5≦0.

The exemplary embodiment, described with reference to FIG. 3, of the detection unit of the invention requires only one minimal memory of 64 bits, only eight multiplication units, which are advantageously made as sign inverters/bit shifters, only 8 integration units, a maximum value determination unit, and a single allocation unit. This detection unit is simple to realize and is characterized by a low power requirement.

Figure 4:
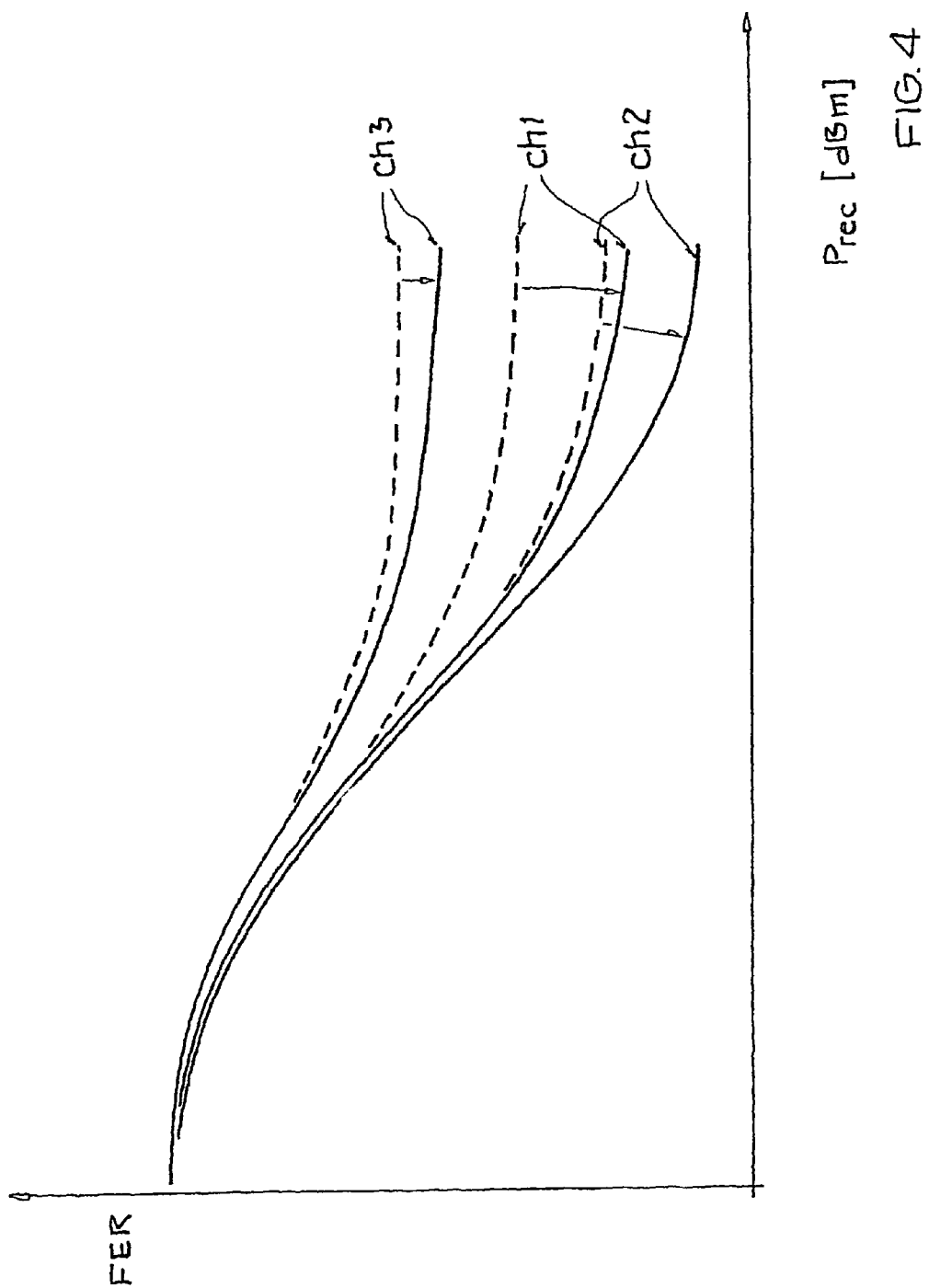
FIG. 4 shows simulation results on the efficiency of the detection unit according to FIG. 3.

FIG. 4 shows simulation results, confirmed by measurements, for the efficiency of a detection unit of the invention or a detection method of the invention. Within the scope of the simulation tests, according to IEEE 802.15.4, transmitted signals containing data frames are generated, transmitted via stochastic models of typical transmission channels, and finally received by a receiving unit 16 according to FIG. 2. In a detection unit 28, according to FIGS. 2 and 3, the demodulated signal was equalized with the use of the above-described second sequences F0, F1, . . . , F7 and the data symbols d0, d1, . . . were detected. The frame error rate (FER) was determined as a measure of the efficiency. In FIG. 4, the thus determined frame error rate FER is shown logarithmically as a function of the power at the antenna connection (Prec) for three typical transmission channels ch1-ch3 in the form of solid lines. The frame error rates, which result when the also above-described two-level sequences G0, G1, . . . , G7 are used for despreading instead of the second sequences F0, F1, . . . , F7, are shown for comparison in FIG. 4 by the dashed lines.

The three typical transmission channels ch1-ch3 are the frequency-selective channel models:
transmission channel ch1: JTC'94 indoor channel 1,
transmission channel ch2: JTC'94 indoor channel 2, and
transmission channel ch3: exponential channel model,
whereby transmission channels ch2 and ch3 in comparison with transmission channel ch1 have a lower or higher value for the RMS delay time (root mean square delay spread).

It is evident first from the dashed lines in FIG. 4 that a despreading/correlation with the two-level sequences G0, G1, . . . , G7 in all three channels ch1-ch3 lead to curves for the frame error rate FER that with increasing received power Prec (on the right in FIG. 4) tend not toward the value zero, but toward a specific fixed value, the so-called error floor.

If the dashed line is now compared with the corresponding solid line for the individual transmission channels ch1-ch3, it is evident that the frame error rate FER as a result of the correlation with the second sequences F0, F1, . . . , F7 (solid lines) declines in all transmission channels ch1-ch3 in comparison with the correlation with the two-level sequences G0, G1, . . . , G7 (dashed lines). With high receiving powers, the frame error rates decline especially greatly, so that a considerable reduction of the particular error floor results, which is indicated in FIG. 4 by arrows. The efficiency of the detection therefore increases by the detection unit of the invention or the method of the invention.

Although the present invention was described above with reference to exemplary embodiments, it is not limited thereto but can be modified in many ways. Thus, the invention is not limited either to WPANs per se or to WPANs according to IEEE 802.15.4 or to the PN sequences specified therein (number and length of the sequences, values of the chips, etc.), rates/period durations of the chips/symbols/bits, etc. The invention is also not limited to the second sequences indicated above.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A detection unit for the detection of data symbols in a demodulated signal, whereby band spreading occurs transmit-side with the use of first sequences whose first chips each assume one of two different first values, the detection unit comprising:
a sequence providing unit for providing a group of second sequences with at least one second chip, each second sequence being assigned to a first sequence and each second chip assuming a specific value of at least two different second values, which differ from the first values, the group having at least one second sequence that has a higher level than the first sequences;
a correlation unit connected to the sequence providing unit for calculating correlation results by correlating the demodulated signal with each second sequence of the group; and
an evaluation unit connected to the correlation unit for deriving values of the data symbols by evaluating the correlation results,
wherein each second chip assumes one specific value of at least two different second values, which each correspond in value to an integer positive power of two ($2^1$, $2^2$, $2^3$).

2. The detection unit according to claim 1, wherein the value of the at least one second chip and/or its chip position within its second sequence are selected so that the error probability of detection due to the correlation decreases with this second sequence when the data symbols are transmitted over at least one typical transmission channel.

3. The detection unit according to claim 1, wherein the number of second chips present in a second sequence is selected so that a number of second chips, exceeding this number does not cause a substantial decrease in the error probability of detection when the data symbols are transmitted over at least one typical transmission channel.

4. The detection unit according to claim 3, wherein each second chip assumes one specific value of four different second values, which correspond in value to a 2× or 4× value of one of the first values.

5. The detection unit according to claim 3, wherein each second chip assumes one specific value of two different second values, which correspond in value to 2× the value of one of the first values.

6. The detection unit according to claim 3, wherein a sign of each second chip of a second sequence agrees with the sign of the positionally equivalent chip of the two-level sequence usable receiver-side, that is assigned to the first sequence to which this second sequence is assigned.

7. The detection unit according to claim 1, wherein each second sequence has at least one third chip, which in each case assumes one of two different third values, which agree substantially in value with one of the first values.

8. The detection unit according to claim 7, wherein in every second sequence, a total number of second and third chips agrees with the number of the chips present overall in this second sequence.

9. The detection unit according to claim 1, wherein the sequence providing unit has exactly one memory, which stores exactly one of the second sequences.

10. The detection unit according to claim 9, wherein the memory has a feedback shift register.

11. The detection unit according to claim 10, wherein a component for clocking the feedback shift register and the sequence providing unit provides the second sequences at the outputs of the specific register cells of the feedback shift register.

12. A detection unit for the detection of data symbols in a demodulated signal, whereby band spreading occurs transmit-side with the use of first sequences whose first chips each assume one of two different first values, the detection unit comprising:
a sequence providing unit for providing a group of second sequences with at least one second chip, each second sequence being assigned to a first sequence and each second chip assuming a specific value of at least two different second values, which differ from the first values, the group having at least one second sequence that has a higher level than the first sequences;

a correlation unit connected to the sequence providing unit for calculating correlation results by correlating the demodulated signal with each second sequence of the group; and an evaluation unit connected to the correlation unit for deriving values of the data symbols by evaluating the correlation results, wherein the group, provided by the sequence providing unit comprises n≧1 second sequences, and wherein the correlation unit comprises:

n multiplication units, each connected to the sequence providing unit, for calculating n product signals by multiplying signal values of the demodulated signal by chip values in each case of one of the second sequences; and n integration units, each connected to one of the multiplication units, for providing n correlation results by adding a number of signal values in each case of one of the n product signals.

13. The detection unit according to claim 12, wherein the multiplication units have a component for sign reversal and a component for bit shifting.

14. A transmitting/receiving device for a data transmission system, comprising:

an antenna;

a transmitting unit, connected to the antenna, for transmitting data, whereby the transmitting unit performs band spreading with the use of first sequences whose first chips in each case assume one of two different first values;

a receiving unit, connected to the antenna, with a detection unit according to claim 1; and a control unit, connected to the transmitting unit and the receiving unit, for controlling the transmitting unit and the receiving unit.

15. A method for detecting data symbols in a demodulated signal, whereby band spreading occurs transmit-side with the use-of first sequences whose first chips each assume one of two different first values, the method comprising:

providing a group of second sequences with at least one second chip, each second sequence being assigned to a first sequence and each second chip assuming a specific value of at least two different second values that differ in value from the first values, the group having at least one second sequence that has a higher level than the first sequences;

calculating the correlation results by correlating the demodulated signal with each second sequence of the group; and deriving values of the data symbols by evaluating the correlation results, wherein each second chip assumes one specific value of at least two different second values, which each correspond in value to an integer positive power of two ($2^1$, $2^2$, $2^3$).

16. The method according to claim 15, wherein the value of the at least one second chip and/or its chip position within its second sequence are selected so that an error probability of detection due to the correlation decreases with the second sequence when the data symbols are transmitted over at least one transmission channel.

17. The method according to claim 15, wherein the number of second chips present in a second sequence is selected so that a number of second chips exceeding this number does not cause a substantial decrease in the error probability of detection when the data symbols are transmitted over at least one transmission channel.

18. The method according to claim 15, wherein each second chip assumes one specific value of four different second values, which correspond in value to the 2× or 4× value of one of the first values.

19. The method according to claim 15, wherein each second chip assumes one specific value of two different second values, which correspond in value to a 2× value of one of the first values.

20. The method according to claim 15, wherein a sign of each second chip of a second sequence agrees with a sign of a positionally equivalent chip of the two-level sequence usable receiver-side that is assigned to the first sequence to which this second sequence is assigned.

21. The method according to claim 15, wherein each second sequence has at least one third chip, which in each case assumes one of two different third values, which agree in value with one of the first values.

22. The method according to claim 21, wherein, in every second sequence, a total number of the second and third chips agrees with the number of the chips present overall in this second sequence.

* * * * *